United States Patent
Regnault et al.

(10) Patent No.: US 9,311,588 B2
(45) Date of Patent: Apr. 12, 2016

(54) SECURE PORTABLE OBJECT

(75) Inventors: Nicolas Regnault, Meudon (FR); Eric Vetillard, Meudon (FR)

(73) Assignee: TRUSTED LOGIC, Meudon (FR)

( * ) Notice: Subject to any disclaimer, the term of this patent is extended or adjusted under 35 U.S.C. 154(b) by 0 days.

(21) Appl. No.: 13/505,025

(22) PCT Filed: Nov. 3, 2010

(86) PCT No.: PCT/EP2010/006693
§ 371 (c)(1),
(2), (4) Date: Apr. 30, 2012

(87) PCT Pub. No.: WO2011/054498
PCT Pub. Date: May 12, 2011

(65) Prior Publication Data
US 2012/0216276 A1 Aug. 23, 2012

(30) Foreign Application Priority Data
Nov. 5, 2009 (FR) .................................. 09 05312

(51) Int. Cl.
*G06F 21/00* (2013.01)
*H04L 29/06* (2006.01)
*G06K 19/073* (2006.01)
(Continued)

(52) U.S. Cl.
CPC .......... *G06K 19/073* (2013.01); *G06Q 20/3574* (2013.01); *G07F 7/1008* (2013.01)

(58) Field of Classification Search
CPC . G06K 19/073; G07F 7/1008; G06Q 20/3574
USPC ............... 726/16; 713/194; 709/312; 705/13; 717/139; 718/1
See application file for complete search history.

(56) References Cited

U.S. PATENT DOCUMENTS 6,005,942 A 12/1999 Chan et al.
6,205,578 B1 * 3/2001 Grove ........................... 717/118
(Continued)

FOREIGN PATENT DOCUMENTS

EP 0949595 A2 10/1999
GB 2475787 A * 6/2011 ............. G06F 21/34
(Continued)

OTHER PUBLICATIONS

Sanchez, J.J.S.; Madrid, N.M.; Seepold, R.; "Secure Residential Gateways: OSGi services with Java Cards"; Electrotechnical Conference, 2006. MELECON 2006. IEEE Mediterranean; Year: May 2006; pp. 832-835.*

(Continued)

*Primary Examiner* — Amir Mehrmanesh
*Assistant Examiner* — Courtney Fields
(74) *Attorney, Agent, or Firm* — The Jansson Firm; Pehr B. Jansson (57) ABSTRACT

The invention relates to a secure portable object of the smart card type comprising (a) an object body and (b) a micromodule comprising a processor and at least one memory in which a first application executed by a first execution engine in a first execution space is stored. The invention is characterized in that a second application is further stored in the said at least one memory, where the said second application is executed by a second execution engine distinct from the first execution engine, in a second execution space distinct from the first execution space. The invention particularly applies to smart cards.

18 Claims, 2 Drawing Sheets

(51) Int. Cl.
   *G06Q 20/34*  (2012.01)
   *G07F 7/10*  (2006.01)
   *G06F 12/14*  (2006.01)
   *G06F 21/34*  (2013.01)

(56) References Cited

U.S. PATENT DOCUMENTS

| | | | |
|---|---|---|---|
| 2003/0135658 A1* | 7/2003 | Haggar et al. | 709/312 |
| 2003/0217092 A1* | 11/2003 | Veselov | 709/106 |
| 2005/0188360 A1 | 8/2005 | De Jong | |
| 2007/0006224 A1* | 1/2007 | Stocker | 718/1 |
| 2009/0043647 A1* | 2/2009 | Hwang et al. | 705/13 |
| 2010/0146304 A1* | 6/2010 | Miyatake et al. | 713/194 |
| 2012/0254844 A1* | 10/2012 | Wilkinson et al. | 717/139 |

FOREIGN PATENT DOCUMENTS

| | | |
|---|---|---|
| JP | 2002-366914 A | 12/2002 |
| WO | WO0137085 A1 | 5/2001 |

OTHER PUBLICATIONS

PCT/EP2010/006693 International Search Report, Mar. 25, 2011, European Patent Office, P.B. 5818 Patentlaan 2 NL—2280 HV Rijswijk.

PCT/EP2010/006693 Written Opinion of the International Searching Authority, Mar. 25, 2011, European Patent Office, D-80298 Munich.

\* cited by examiner

SECURE PORTABLE OBJECT

SCOPE OF THE INVENTION

This invention relates to the area of generally standardised secure portable objects such as smart cards. Such objects comprise (a) a card body and (b) a micro-module. The micro-module comprises a processor and one or more memories in which a first and a second application are stored.

PRIOR ART

Smart cards are generally standardised secure portable objects with particularly limited hardware and software resources.

Some of the currently available cards, particularly so-called Java Card™ cards, comprise a virtual machine. Such a virtual machine comprises an execution engine (interpreter). The execution engine is capable of interpreting instructions from a smart card application and executing them in an execution space that is in practice defined by the said virtual machine.

Some cards implement a plurality of Java Card™ applications. In that case, all the Java Card™ applications are executed within the same execution space and are often governed by the same security rules. Thus, even though that is not necessary, some applications, which should not require a high level of security for execution, can access confidential resources which they should not be able to access, within the execution space defined by the virtual machine. That leads to a security problem. Further, and even if that is necessary only for some applications, extensive safety measures are implemented for all applications, including those where the application of such measures is not justified in view of the reliability expected. In one example, redundant computation execution or redundant data storage is used for all applications, regardless of what they are. As a result, card resources are used for the execution of applications that do not need them, with an effect on card performance.

SUMMARY OF THE INVENTION

In view of the above, one technical problem that this invention sets out to solve is that of making secure portable objects of the smart card type that can execute a plurality of applications, making up for the aforementioned drawbacks of the earlier art, where the security of execution of the said plurality of applications is reinforced, particularly when these applications do not require access to certain security resources, and where the impact of the implementation of security measures on card performance is limited, when the said measures are not justified for the execution of some applications.

The solution provided by the invention to this technical problem comprises firstly a secure portable object of the smart card type, including (a) an object body and (b) a micro-module with a processor and one or more memories in which a first and a second application are stored, characterised in that it further comprises a first and a second execution engine capable of executing the said first and second applications, and in that the said first application is executed by the said first execution engine in a first execution space and the said second application is executed by the said second execution engine in a second execution space that is distinct from the first execution space.

Secondly, it comprises a method for securing a secure portable object of the smart card type, including (a) an object body and (b) a micro-module with a processor and one or more memories in which a first and a second application are stored, characterised in that it comprises the following stages, where:

a first and a second execution engine are provided that are capable of executing the said first and second applications;

the first execution engine executes the first application in a first execution space; and the second execution engine executes the second application in a second execution space distinct from the first execution space.

Thus, if the first application, for instance, must be executed in an execution space that extends to critical security resources, the second application could not have access to the said resources, making the object more secure. Further, it will be possible to implement security measures that are different from one application to another, depending on the execution engines, thus improving card performance.

Advantageously, (a) the second execution engine is distinct from the first execution engine; (b) the first execution engine is the execution engine of a first virtual machine and the second execution engine is the execution engine of a second virtual machine; (c) the virtual machines are Java Card™ virtual machines and the first and second applications are Java Card™ applications; (d) the security measures required by the virtual machines for the execution of the applications they manage in their execution space are different from one virtual machine to another, and the applications are arranged in the said virtual machines depending on the security level required for their execution; (d) the security measures required by virtual machines for executing the applications managed by them in their execution space are different from one virtual machine to another, and the applications are arranged in the said virtual machines depending on their certification or the result of their verification; (e) one execution space extends to a specific resource and another execution space does not extend to the said specific resource; (f) the specific resource is a memory zone and the data stored in the said memory zone, a communication channel, communication or data storage devices or a code library; (g) the resources of the virtual machines are shared; (h) the shared resources include the memory devoted to applications or some code libraries common to the virtual machines; (i) the said object is a subscriber identification module designed to be inserted in a mobile telephone comprising a module for near field radiofrequency communication, the said subscriber identification module has a first communication interface routed to the said module for near field radiofrequency communication and a second communication interface, and access to the first communication interface is only allowed in the first execution space; (j) the first application is exclusively executed by the first execution engine in the first execution space, to the exclusion of any execution by the second execution engine in the second execution space, and the second application is exclusively executed by the second execution engine in the second execution space, to the exclusion of any execution by the first execution engine in the second execution space; (k) the method according to the invention further comprises steps during which: (a) the execution space to allocate to each application to install is identified and the said application is installed so as to be executed in the said execution space; (b) the execution space is identified at least by the identity of the provider of the said application; (c) the execution space is identified at least by the level of verification or certification of the said application; (d) the said first execution space provides access to a resource, the said second execution space does not allow access to the said resource, and the said execution space to allocate is identified at least by the need of the said application to access the said resource; and (e) the said resource is a communication interface of the said secure portable object.

BRIEF DESCRIPTION OF FIGURES AND DRAWINGS

The invention will be better understood after reading the non-limitative description below, which refers to the drawings appended, where.

DETAILED DESCRIPTION OF THE INVENTION

The invention concerns a secure portable object of the smart card type. The object comprises, firstly, an object body, for example a plastic card body of standardised dimensions, and, secondly, a micro-module.

The micro-module of the object according to the invention comprises at least one processor and at least one memory in which at least two applications and their data are stored. The two applications are executed intermittently by the processor.

The resources of the objects according to the invention, and particularly the hardware resources and more particularly the memory size, are limited.

According to the invention, a first application is executed by a first execution engine in a first execution space and a second application is executed by a second execution engine in a second execution space. Advantageously, the first execution engine is part of a first virtual machine and the second execution engine is part of a second virtual machine. The object according to the invention thus includes at least two virtual machines, e.g. Java Card™ virtual machines. The two virtual machines can possibly share some resources. The virtual machines can provide different levels of security.

Execution Spaces

Each application is designed to be executed in an execution space with certain characteristics. These characteristics may include the following, for example:

the nature of the execution space and, more specifically, the type of processor or virtual machine defined by a certain set of instructions;

the provision of means to access resources, such as the possibility to read or edit some data in the memory, particularly according to the degree of confidentiality of the data, or their critical nature (importance of protecting their integrity), channels for communication with peripheral devices or other systems, or code libraries;

security measures aimed at protecting the code of applications and the data handled by them from other applications or outside parties;

The invention relates to objects comprising at least two applications designed to be executed in execution spaces with at least the nature of the execution space as a common characteristic. For example, they may be two Java Card™ applications, both designed to be executed in a Java Card™ virtual machine. As regards their other characteristics, some are common and others are different.

According to the invention, the object provides the two applications with separate execution spaces. These spaces do however share some components, depending on the requirements common to the two applications.

More generally, the object according to the invention can provide several execution spaces and can allow the running of several applications, either with each application having its own execution space or with the applications grouped in a smaller number of execution spaces according to criteria such as the sets of characteristics required and the required level of security.

Sharing of Resources

The portable object comprises different resources in limited quantity, which are distributed between the applications. One resource of the said object is the memory. Most of the objects further comprise additional functional components that allow interaction with users, exchange of data with other computer systems or action on or observation of outside physical systems. All these resources must be distributed between the applications, either because a given resource has been set aside for an application, or because it is shared between several applications, in which case the object according to the invention manages this distribution.

Memory

The object according to the invention comprises one or more memories, which may be of one or more types. The memory may for instance be a RAM, a permanent rewritable memory such as of the EEPROM type or a ROM. The quantity of memory contained in the objects according to the invention is particularly limited. In particular, the size of the ROM memory is of about a few hundred Kb and the size of the EEPROM memory is of about a few tens of Kb.

Each application is a computer program, the code of which is stored in a memory of the portable object according to the invention. Further, each application stores data in at least one memory.

According to the invention, each execution space has one or more portions of memory that are allocated to it specifically. Other portions of memory may further be allocated to software components that are shared between several execution spaces, or may form shared memory zones that are simultaneously accessible to several execution spaces.

Reserved Resources

Some resources are reserved for an application or a category of applications. The resources are then managed directly by an execution space, and any application that needs to use the resource is executed by that execution space.

Some objects have one or more communication or data storage devices that may only be used legitimately by some applications. In that case, it is advantageous to manage these devices directly within an execution space. The applications that need to access the devices are executed within the said execution space, whilst the other applications are executed in execution spaces that do not offer such access.

An object according to the invention may comprise resources that may only be used by approved providers. These resources may be peripheral devices, but also for example code libraries, the use of which requires the payment of a fee. It is in that case advantageous to execute the approved applications in an execution space with the resources concerned, and the other applications in an execution space that does not allow access to the said resources.

Shared Resources

Some resources need to be shared between several applications, or even all applications. It is then advantageous to authorise and allow the different execution spaces to use such resources. One means of achieving that is to manage each resource concerned with the help of a specific software component located logically outside the execution spaces. The execution spaces use the component to access the resource in question.

Communication Channels

An important specific case of a potentially shared resource is a means of communication. If only one application uses that means of communication, it is possible to cause the means of communication to be managed by an execution space and to make sure that the application is executed by that execution space. On the other hand, if several applications are likely to use the means of communication, a software component must allow the sharing of the means of communication. The component may either be part of an execution space, in which case only the applications that are executed in the said execution space have access to the said means of communication, or be outside the execution spaces and usable by all the execution spaces so that all the applications can access the said means of communication.

In one mode of embodiment of the invention, the applications that may be executed in the object according to the invention are denoted by an identifier, for example a number or a string of characters, and the means of communication makes it possible to receive messages where the recipient is indicated in the form of the identifier of the application which is to handle the message. In that case, the software component responsible for the first-line processing of the messages received at least partly decodes every message received in order to identify the identifier of the application that is the recipient of the message. The said software component can further access a correspondence table that associates, for each application likely to receive messages, the identifier of the said application with the identifier of the execution space in which the said application is executed. The said software component then forwards the message to the execution space in which the recipient application is executed. If necessary, the said software component triggers the processing of the message by the recipient application, for example by making its execution space active and triggering the procedure for handling the messages received from the said application.

Distribution of Software Components

The secure portable object according to the invention comprises at least two secure execution spaces of the same type. These spaces are defined by virtual machines. These may for instance be Java Card™ virtual machines. An execution space is generally defined by several software components, among which can be typically identified an execution engine formed by the virtual machine stricto sensu, where the other components appear as additional elements such as device drivers, memory managers, security managers or code libraries (API).

In the invention, some of these components are shared between the execution spaces. In other words, the codes of the said components are only stored once in the memory. For their part, other components are specific to an execution space. In that way, either the other components are only accessible to one execution space to the exclusion of another, or several versions of these other components exist, but with different properties.

Execution Engine

In the invention, the execution spaces are of the same nature, i.e. the application format that they can execute the same. In particular, it is thus natural, whenever possible, to use the same execution engine for different applications and thus share the execution engine. If the applications are in native format, i.e. aimed at being executed directly by a processor (physical component), the execution engine is the said processor, which is shared inherently. If the applications are in another format, i.e. if an adapted execution engine is a virtual machine, the sharing of the code that implements the virtual machine is possible but not imposed.

In one mode of embodiment of the invention, even if the execution engines have the same fundamental functional properties in that they are capable of executing the same applications, the execution engines have different secondary characteristics, and thus have different codes. For example, examples of secondary characteristics have been presented that one execution engine may have, but not the other.

In one example of embodiment, an execution engine comprises additional security measures designed to protect the data handled by the application. For instance, the data stored in the object or communicated with an outside system may be encrypted. As these safety measures have a cost in terms of computation time and possibly memory size, another execution engine does not comprise such security measures to offer better performance to the applications that do not handle confidential data.

In one example of embodiment, an execution engine comprises additional security measures designed to protect the integrity of the data handled, including if the execution is disrupted, for example if the power supply to the object is suddenly interrupted or if the said object overheats or if a physical component of the object is damaged. The disturbances envisaged may also include attacks on the object from a third party attempting to read data to which it ought not to have access or achieve illegitimate behaviour by the object, for example to authorise a bank transaction that should not be authorised. Such security measures often include the execution of redundant computations or the storage of redundant data. They therefore have a cost that is not necessarily justified in view of the reliability expected. Another execution engine does not provide for such redundancy, which also offers better performance to the detriment of data integrity.

In one example of embodiment, an execution engine includes control of memory accesses by the applications executed by it in order to prevent accesses outside the portions of memory that are allocated to the application, whilst another execution engine does not provide for such controls. The second execution engine, which executes applications faster and with smaller memory requirements, is thus set aside for applications where the provider is supposed to be sufficiently reliable, which can be recognised by a certificate accompanying the application or the applications where memory accesses have first been verified automatically or manually.

In one example of embodiment, one execution engine is faster than the other, but at a higher cost in terms of some physical resources such as power consumption. In this case, the choice of the execution engine is the result of a compromise between the execution performance and the consumption of physical resources.

In one example of embodiment, one execution engine is more efficient than the other, but its use is subject to pricing that depends on the number of applications executed by it or characteristics such as the size or complexity of the applications.

In one variant of the mode of the invention that has just been described, the execution spaces are of the same type but different in some details. The execution spaces may for example be defined by virtual machines that meet the same standard, but additionally provide some extensions that are not necessarily compatible with each other. It is then advantageous to provide the execution engines with an execution space for each incompatible family of extensions.

In another variant of the invention, the execution engines share part of the code. That is possible, and even desirable, providing the execution engines are made to be sufficiently alike, and only differ for example, in the completion of certain particular operations. Several modes of embodiment of this variant are possible. In two modes of embodiment, the execution engines are virtual machines where one part of the code, called decoding, executed for each instruction, is aimed at decoding the operation carried out by the instruction and transferring control to another part of the code, which is specific to each operation.

In one first mode of embodiment, the core of the execution engine, particularly comprising the instruction decoding code, is common to the two execution spaces. A memory cell contains an identifier of the active execution space. When the decoding code detects an instruction that must be executed differently depending on the execution space, it reads the address of the code corresponding to the operation to be carried out in the active execution space from a table, and transfers the control to the code located in this way.

In a second mode of embodiment, each execution space has an execution engine that is specific to it. When the decoding code detects an instruction that must be executed in the same way in both the execution spaces under consideration, the said decoding code transfers the execution to a part of the code that is common to the two execution spaces.

It should be noted that virtual machines are liable to be contained in the same memory or in different memories of the object according to the invention. In the first example, two Java Card™ virtual machines are contained in a single ROM memory of the object. In a second example, a first virtual machine is contained in a ROM memory of the said object, and a second virtual machine is contained in a different memory of the object, in an EEPROM memory.

Additional Components

Independently of the fact that execution spaces share the execution engine or otherwise, they can share or have their own different additional components. For example, a typical Java Card™ virtual machine comprises, in addition to the execution engine responsible for interpreting the instructions that make up the code of the applications, differentiated libraries such as the Java Card API (application programming interface), a firewall, an applications registry, a memory manager, a dispatcher and a number of libraries developed additionally depending on the needs of the applications. Depending on the case, it may be preferable for each component to be either shared by the different applications for each application to have its own component. Typically, sharing makes it possible to save memory and facilitates communication between applications, whilst separation increases insulation and allows different implementations of the component in question. It should be noted that in each case, some components can be shared whilst others are separated.

Choice of the Execution Space

In the invention, each application is allocated an execution space from the execution spaces available in the object. Several modes of embodiment of this allocation are possible, differing particularly in the time when the allocation is identified and when it becomes effective. Also, the allocation may be based on several criteria. Some examples of allocation methods and allocation criteria are mentioned here, it being understood that other modes are possible.

Allocation Methods

The installation of an application on a secure portable object according to the invention involves at least loading the code of the application in the object, so that the said code is placed in a memory of the object. Loading may consist in transmitting the said code to the object after suitably programming the object to store the said code in the said memory, but other methods are possible, particularly the code of the application may be placed in a ROM of the object when the said object is made. In the invention, the method for installing the application involves identifying the execution space allocated to the application. The allocation space may be identified in one or more steps, before, after or along with loading.

In a first mode of allocation, when the code of an application is loaded in a memory of the object, the code is placed in a zone of that memory that is allocated to one of the execution spaces, identified according to allocation criteria. The memory may for example be a ROM if the said code is loaded while the object is manufactured, or a rewritable memory of the EEPROM type if the code is loaded after the object is manufactured. The application is then allocated to that execution space, which takes charge of installing and executing it.

In a second mode of allocation, when the code of the application is loaded in a memory of the object, an installation process takes place that involves executing the code supplied with the application, a code that is already present in the object or a combination of the two. During this method, the execution space is identified on the basis of allocation criteria, and information associating the application with the identified execution space is stored in the memory. Optionally, the execution space executes an additional procedure for installing the application. When the application needs to be executed, the software component responsible for the execution reads the said information associating the application with the execution space and triggers the execution of the application in the execution space identified in that manner.

In a third mode of allocation, when the application is executed, either upon an explicit request from the user of the object or following an internal or external stimulus such as a time event (e.g. a timer event or a timeout event) or the receipt of a request on a device or a means of communication, the software component responsible for the execution identifies the execution space on the basis of the allocation criteria and triggers the execution of the application by the execution space identified in that manner.

Allocation Criteria

The allocation may be determined by the developer or the provider of the application. In that case, the application as it has been distributed by its developer or provider and loaded in the object, includes, in addition to its executable code, at least one piece of information identifying the execution space to use.

It is possible to allocate a different execution space to each developer or provider of applications or groups of developers or providers. In that case, the application is loaded in the card with a piece of information identifying the developer or the provider of the card.

The execution space may be selected by person installing the application on the object or automatically on the object during or after the installation depending on the indications supplied with the application. The information relates to the needs of the application or recommendations relating to its execution. The information may for instance concern:

the level of security expected by the application;
the level of confidentiality of the data typically handled;
the level of reliability expected by the application;
the devices that the application is likely to use;
the means of communication used by the application;
the extensions to be supported by the execution engine;
the code libraries required for the application to function;
more generally, any resource required for the application to function.

For example, if a first execution space allows access to a certain device whilst a second execution space denies access to the same device, the applications requesting access to the device will be allocated to the first execution space whilst the other applications will be allocated to the second execution space.

The execution space may be determined by a static analysis of the application, i.e. by a manual or automatic examination of the code of the application in order to determine some characteristics. For instance, one may:

allocate an execution space in which some memory accesses are not protected from the possible overrun of the memory zones authorised to the applications where the static analysis shows that they only carry out authorised memory accesses and allocate an execution space in which all the memory accesses are verified to applications where the static analysis shows that they could carry out memory accesses outside the authorised zones; and/or allocate an execution space comprising measures for protection from some attacks to applications where the static analysis shows that they are liable to such attacks, and allocate an execution space with no such measures for protection to the applications where the static analysis shows that their behaviour is not disrupted by such attacks.

It should be noted that these different criteria may be combined in different ways. For instance, execution spaces may be allocated to some providers of applications, and other rules may be used to identify the execution space allocated to the applications of unknown providers. One may use information that is supplied optionally with the application, and identify the execution space by a static analysis if the information is missing. Conversely, a static analysis, which is not always conclusive, can be carried out in all cases, and the indications supplied with the application could be used only when the static analysis is not conclusive. Other methods of identification that combine the choice methods described here are possible.

Example 1

Separate Virtual Machines

Figure 1:
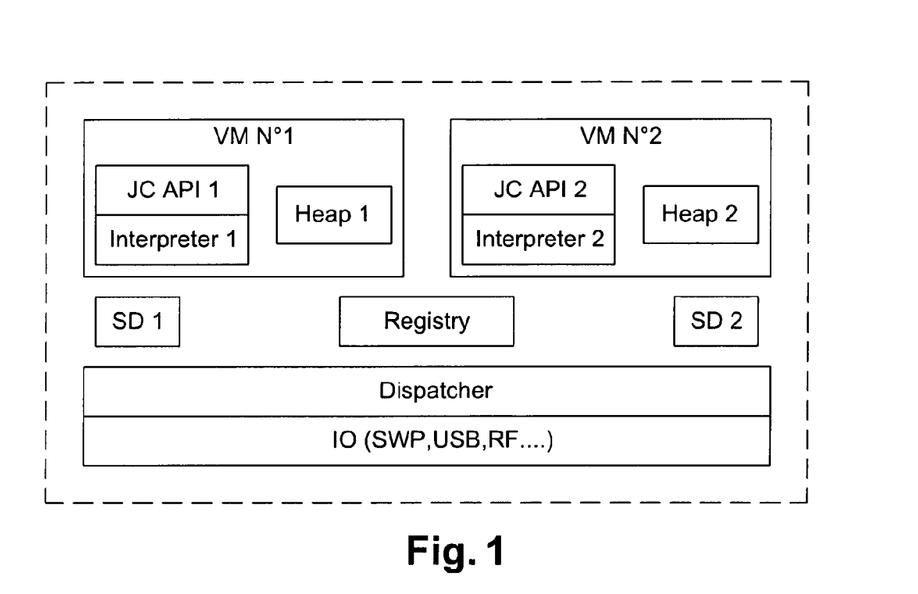
FIG. 1 is a schematic illustration of an example of embodiment of an object according to the invention, where the said object comprises two separate Java Card™ virtual machines.

In a first example of embodiment of the invention illustrated in FIG. 1, the portable object is a smart card on which at least two Java Card™ virtual machines, VM 1 and VM 2 are executed.

Each virtual machine has its own execution engine Interpreter 1, Interpreter 2, its own libraries JC API 1, JC API 2, and its own memory, or heap, devoted to applications Heap 1, Heap 2. That organisation offers the advantage of offering a high level of insulation between the applications executed in the first execution space and in the second execution space, because the virtual machines VM 1 and VM 2 do not allow the applications to access the memory outside their heap, Heap 1, Heap 2. Each application is stored in the heap of a particular virtual machine, stores these data in the said heap and is executed within the said virtual machine.

Some components are shared between the virtual machines. In a conventional Java Card™ smart card with a single Java Card™ virtual machine, the registry is a software component that particularly manages a list of installed applications, with indications for each application such as its availability (under installation, executable, blocked etc.) and the permissions that have been given to it. In this example of embodiment, the registry is shared between the execution spaces and holds an identifier of the execution space allocated to the application for each application, in addition to conventional information.

The IO input/output drivers for the different ISO 7816, SWP, USB, RF and other interfaces of the smart card are also shared between the virtual machines, so that the card only has one input/output driver for each interface.

The messages received by the smart card are processed by a software component that dispatches the messages by analysing each message received in order to determine the recipient application and triggers the execution of the said application on the said message. That dispatcher of received messages is also shared between the virtual machines. When a message is received, once the recipient application has been identified, the received message dispatcher queries the registry in order to identify the execution space in which the recipient application will be executed, and triggers the processing of the message by the application within the said execution space.

Example 2

SD Security Domains

To distribute the applications between the virtual machines, it is advantageous to use existing classification infrastructure, the deployment of which will now be described.

As illustrated in FIG. 1, a particular application called a security domain, SD1 and SD2 is executed in each of the virtual machines VM1 and VM2. The security domain manages security-related data of a set of applications. In general, each provider of applications also provides a security domain that is used for all the applications of the supplier. The security domain particularly holds the secret keys specific to the provider and carries out some operations on behalf of other applications, particularly the installation of applications and the loading of data, where the code of the applications and the data loaded are encrypted and authenticated so that only the provider in question (or a representative to whom the required keys are given) can act on its own applications.

In the example here, it is advantageous for each virtual machine to contain only one security domain. In that way, each virtual machine VM 1, VM 2 is associated with a provider of applications. Indeed, the separation of virtual machines provides a degree of insulation between the applications that are executed on the first virtual machine VM 1 and the applications that are executed on the second virtual machine VM 2. In particular, that provides the assurance of the impossibility for the applications of provider 1 to access the data of provider 2 and vice versa.

When an application is loaded in the card, it has an associated security domain, either because it is supposed to be already loaded in the card and is referenced by the application or because the security domain is loaded at the same time as the application in question. The application manager on the card triggers the installation of the application in the virtual machine, making the provided security domain operate. If it is not already present in the card, the application manager sets aside a part of the memory and starts a new virtual machine that uses that portion of the memory. Then, the application manager triggers the installation of the new security domain in the new virtual machine and then the installation of the newly-loaded application in the new virtual machine. If the security domain is neither supplied nor present already or if the security domain is new and supplied but a new virtual machine cannot be started (e.g. because the card does not support that function or because an insufficient quantity of memory is available), the loading of the application fails.

Thus, a smart card that complies with the implementation described here could safely act as the medium for applications with high security requirements. For example, the card may act simultaneously as a bank card (with one virtual machine (VM) devoted to the applications provided by the bank of the card holder) and as a transport card (with one virtual machine devoted to the applications provided by the transport operator). The card could additionally be a SIM card inserted in a mobile telephone, and could allow the running of a virtual machine that is devoted to telecommunications applications.

Example 3

Different Virtual Machines

In this example, the smart card allows the running of several virtual machines, which, even though they are capable of executing the same applications, have different properties so that for each application, some virtual machines are more appropriate than others. The differences relate to the security of the different applications and the data handled by them.

While loading an application in the smart card, the code of the application is analysed by a software component called the verifier. This component is either loaded in the card and executed by it or executed before loading stricto sensu by an entity responsible for the security of the smart card. The verifier runs a static analysis of the code of the application in order to determine its properties with security implications. Its analysis may be supported by optional annotations supplied with the code of the application. In particular, the verifier may conclude that there is absolutely no risk that the application could access the memory or other resources for which it is not authorised. The verifier thus calculates a level of security of the application, either by differentiating secure applications (for which it guarantees the absence of forbidden accesses) from unsecure applications (where no guarantee is provided), or by providing a more precise result.

If the application is identified by the verifier as sufficiently secure, it is loaded in and subsequently executed by a virtual machine that does not verify some accesses to the memory or to other resources, namely the accesses that the verifier guarantees as impossible. If, on the other hand, the verifier does not provide such a guarantee, the application is executed by a different virtual machine that carefully verifies each potentially hazardous access and refuses unauthorised accesses during the execution. In that way, the same smart card can execute any appropriate application, but executes those applications that can be guaranteed to be secure faster.

In one alternative of embodiment, the smart card provides two virtual machines capable of executing the same applications, but the first virtual machine has measures for protection from software or hardware attacks aimed at affecting the integrity or the confidentiality of the data manipulated by the applications that are executed there, whilst the second virtual machine does not have such protective measures. The applications that handle sensitive data are allocated to the first virtual machine, whilst the other applications are allocated to the second one, which is made more efficient by the absence of protective measures. The second virtual machine can also be used for testing and debugging applications that are under development. It should be noted that in this last case of use, it is necessary for both virtual machines to be identical from the point of view of the functional behaviour of the applications that are executed in it, but different from the standpoint of outside observations.

Example 4

Shared Memory

Figure 2:
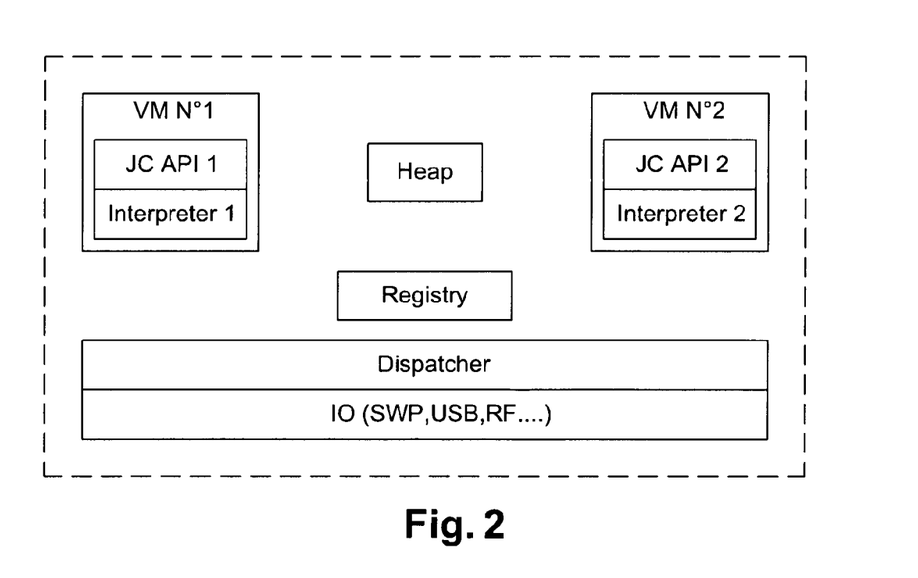
FIG. 2 is a schematic illustration of an example of embodiment of an object according to the invention, where the said object comprises two virtual machines, the memory devoted to the applications of which is put in common.

In the example of embodiment presented in FIG. 2, the smart card comprises at least two Java Card™ virtual machines VM 1, VM 2, where each virtual machine has its own execution engine Interpreter 1, Interpreter 2 and its own libraries JC API 1, JC API 2. However, the memory devoted to Heap applications is shared. The components that are single by nature, such as the registry, the received message dispatcher and the IO drivers for ISO 7816, SWP, USB RF etc., are equally shared by the different virtual machines.

The sharing of the memory devoted to the applications makes it possible to save memory in relation to the case where each virtual machine has its own specific memory space for the applications. Indeed, each division of the memory leads to loss of memory as one part of the free memory space that is located in one virtual machine that does not need it is lost to the other virtual machine. Such sharing may also allow economies of scale as regards the memory devoted to memory management. This aspect is particularly important for smart cards where the resources, particularly in terms of RAM, are limited.

The fact that the memory in which the applications are stored is shared also facilitates the exchange of data between applications. That organisation is thus preferable if the possibility of communication between applications is required and if security can be provided other than by insulating the applications from each other. Sharing the memory can also allow one application to call an interface provided by another application that is executed in another virtual machine and thus to trigger, from one virtual machine, code that is executed in the said other virtual machine.

Also, even if the virtual machines are separate, they may have shared access to some libraries of code that is implemented independently from the virtual machine, e.g. code that handles data formats, or numerical computation libraries.

As part of this example, the virtual machines offer different possibilities. For example, one virtual machine has measures for protection from physical attacks aimed at bypassing the execution of some security verifications by methods such as disruptions of the power supply of the smart card. The virtual machine is devoted to the execution of applications that handle sensitive data, which the smart card holder could attempt to modify illegitimately. Another virtual machine does not offer such measures of protection and is thus faster. It is used for applications that do not require a high level of protection.

In another example, the Java Card™ virtual machines add different extensions, which may be incompatible with the Java Card™ language. In that case, the applications that require an extension specific to the language are executed by the virtual machine offering the extension in question. The applications that do not require any particular extension may be executed by any virtual machine and the virtual machine offering the best performance would preferably be selected.

Example 5

Separate Communications

Figure 3:
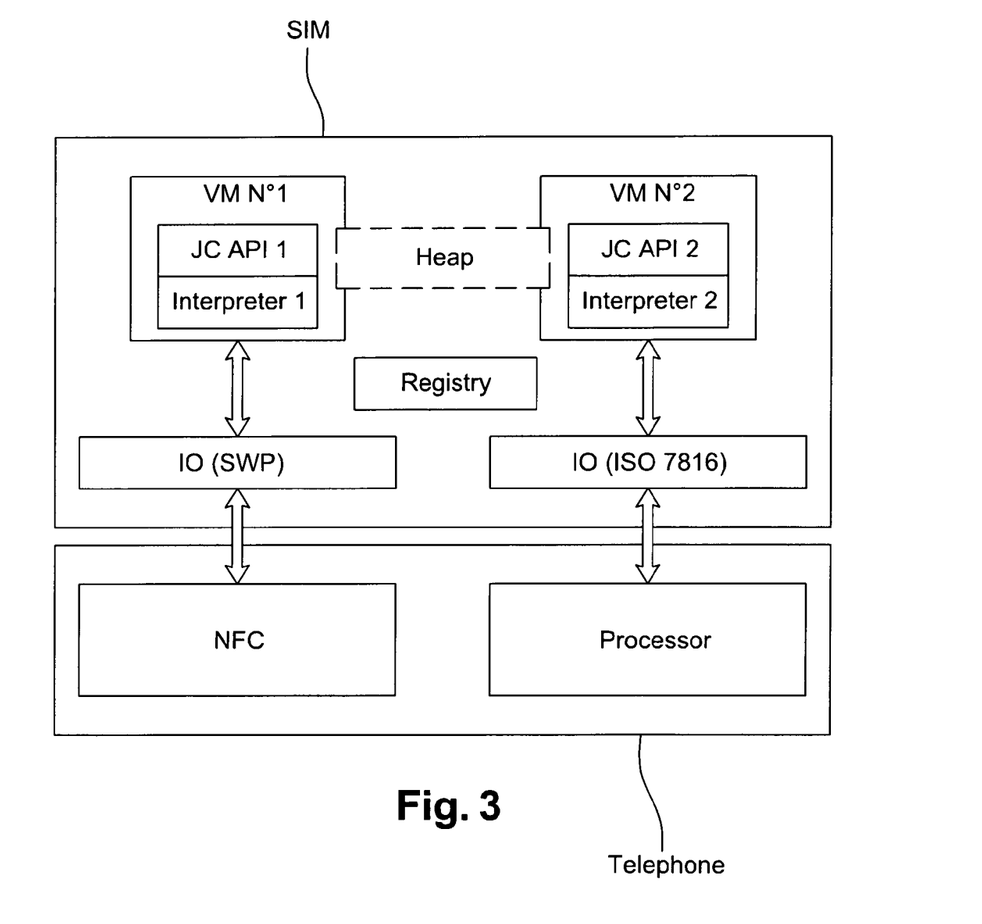
FIG. 3 is a schematic illustration of an example of embodiment of an object according to the invention, where the said object comprises two virtual machines, and where a first virtual machine accesses the first means of communication and a second virtual machine accesses second means of communication, the said first and second means of communication being separate.

In this example, which is illustrated in FIG. 3, the smart card is a subscriber identification module (SIM card) designed to be inserted in a mobile telephone, where the said mobile telephone comprises a module for near field radiofrequency communication (NFC module).

The card then has a first logical interface for communication with the telephone, and, more specifically, with the NFC module of the said telephone. That first logical interface is an interface that implements card communication with the mobile telephone using the SWP (Single Wire Protocol) protocol. The interface is thus routed to the said module and communication is carried out using the SWP protocol.

Further, the card has a second logical interface for communication with the telephone, and, more specifically, with the main processor of the said telephone. That second logical interface is an interface that implements card communication with the telephone on the basis of the communication protocol or protocols defined in the standard ISO 7816.

In this example, the smart card allows the running of two separate Java Card™ virtual machines VM 1 and VM 2. Each of the two virtual machines VM 1, VM 2 has its own execution engine Interpreter 1, Interpreter 2 and its own libraries JC API 1, JC API 2. The first virtual machine (VM 1) is devoted to contactless applications, for example transport applications, and it alone access the logical interface for communication with the NFC module of the telephone. The second virtual machine VM 2 is devoted to telephone applications and it alone accesses the interface for communication with the processor of the telephone for implementing the telephone functions of the processor.

Thus, access to the first communication interface is only authorised in the first execution space whilst access to the second communication interface is only authorised in the second execution space.

It should be noted that some components remain advantageously shared between the virtual machines. Thus, the card has only one applications registry listing the applications installed in all the virtual machines. For example, that makes it possible to use an interface to load an application designed to communicate with a different interface.

It should further be noted that the memory devoted to Heap 1, Heap 2 applications may or may not be shared between the virtual machines; the benefits of each approach have been discussed in relation with the implementations outlined above. One part of the memory may always be shared, and particularly the code libraries common to the two execution spaces, while setting aside, within each virtual machine, memory for the data that it is preferable to not share, particularly sensitive or confidential data.

The invention claimed is:

1. A secure portable object of the smart card type comprising (a) an object body and (b) a micro-module comprising a processor and one or more memories in which a first application having a first application format and a second application distinct from the first application yet having the first application format are stored, a first execution engine of a first virtual machine and a second execution engine of a second virtual machine are respectively capable of executing the first and second application, and in that the first application is executed by the first execution engine in a first execution space and the second application is executed by the second execution engine in a second execution space distinct from the first execution space the first execution engine being distinct from the second execution engine wherein the second execution space has a secondary characteristic distinct from the first execution space, wherein the second execution engine implements additional security measures designed to prevent that an application executed by the second execution engine from making memory accesses outside a portion of memory allocated to the application and wherein the second application is allocated to be executed in the second execution space based on a requiring the secondary characteristic and the first application is allocated to be executed by the first execution space based on a requirement of not requiring the secondary characteristic.

2. The secure portable object according to claim 1, wherein the virtual machines (VM 1, VM 2) are Java Card™ virtual machines and in that the first and second applications are Java Card™ applications.

3. The secure portable object according to claim 1, wherein the security measures required by the virtual machines for the execution of the applications managed by them in their execution space are different from one virtual machine to another, and in that the applications are arranged in the said virtual machines on the basis of the security level required for their execution.

4. The secure portable object according to claim 1, wherein the safety measures required by the virtual machines for the execution of the applications managed by them in their execution space are different from one virtual machine to another, and in that the applications are arranged in the said virtual machines on the basis, of their certification or the result of their verification.

5. The secure portable object according to claim 1, wherein an execution space extends to a specific resource and in that another execution space does not extend to the said specific resource.

6. The secure portable object according to claim 5, wherein the specific resource is a memory zone along with the data stored in the said memory zone, a communication channel, communication or data storage devices or a code library.

7. The secure portable object according to claim 1, wherein resources of the virtual machines (VM1, VM 2) are shared.

8. The secure portable object according to claim 7, wherein the shared resources include the memory devoted to the applications (Heap) or some code libraries common to the virtual machines.

9. The secure portable object according to claim 1, wherein the said object is a subscriber identification module designed to be inserted in a mobile telephone comprising a module for near field radiofrequency communication, in that the said subscriber identification module has a first communication interface routed towards the said module for near field radiofrequency communication and a second communication interface, and in that access to the first communication interface is only authorized in the first execution space.

10. The secure portable object according to claim 1, wherein first application is exclusively executed by the first execution engine in the first execution space, to the exclusion of any execution by the second execution engine in the second execution space, the second application is exclusively executed by the second execution engine in the second execution space, to the exclusion of any execution by the first execution engine in the second execution space.

11. A method for securing a secure portable object of the smart card type comprising (a) an object body and (b) a micro-module comprising a processor and one or more memories in which a first application having a first application format and a second application distinct from the first application and yet having the first application format are stored, further comprising the following stages, where:
- providing a first execution engine of a first virtual machine and a second execution engine of a second virtual machine, each capable of executing the said first and second applications, respectively;
- executing the first execution engine the first application in the first execution space;
- executing the second application in the second execution space wherein the second execution space is distinct from the first execution space;
- identifying the execution space to be allocated for each application to install based on a secondary characteristic of such second execution space wherein applications requiring said secondary characteristic are identified to be installed in the second execution space whereas applications not requiring the secondary characteristic are identified to be installed in the first execution space; and
- installing the each application so that the each application is executed in the execution space to which the each application is allocated.

12. The method according to claim 11, wherein the execution space is identified at least by the identity of the provider of the application.

13. The method according to claim 11, wherein the execution space is identified by determining at least by the level of verification or certification of the application.

14. The method according to claim 11, wherein the said first execution space allows access to a resource, the second execution space does not allow access to the said resource, and the execution space to allocate is identified at least by the need of the application to access the said resource.

15. The method according to claim 14, wherein the said resource is a communication interface of the secure portable object.

16. The secure portable object according to claim 1, wherein the secondary characteristic distinguishing the second execution engine from the first execution engine is that the second execution engine implements additional security measures designed to protect data or the integrity of the data handled by an application executed by the second execution engine.

17. The secure portable object according to claim 1, wherein the secondary characteristic distinguishing the second execution engine from the first execution engine is that the second execution engine executes applications faster than the first execution engine at the expense of higher cost in terms of consumption of physical resources.

18. The secure portable object according to claim 1, wherein the secondary characteristic distinguishing the second execution engine from the first execution engine is that the second execution engine executes applications for a virtual machine extension that implement features incompatible with the applications that do not make use of the virtual machine extension.

* * * * *